United States Patent [19]
Jones et al.

[11] 4,128,200
[45] Dec. 5, 1978

[54] LIVESTOCK GUIDE AND MANIPULATOR

[75] Inventors: Robert W. Jones, Mt. Pulaski, Ill.;
Wesley E. Jones, R.R. 1, Chestnut, Ill. 62518

[73] Assignee: Wesley E. Jones, Chestnut, Ill.

[21] Appl. No.: 744,728

[22] Filed: Nov. 24, 1976

[51] Int. Cl.² .................. B68B 11/00; A22B 3/06; A01K 29/00
[52] U.S. Cl. ................................... 231/2 E; 17/1 E; 119/143; 273/84 ES; D30/32
[58] Field of Search .................. 231/2 E; 17/1 E; 273/84 ES; 361/232; 128/419 S, 415, 404; 119/20, 22, 143, 150; D30/32, 99

[56] References Cited
U.S. PATENT DOCUMENTS

| | | | |
|---|---|---|---|
| 1,400,149 | 12/1921 | Gleeson | 128/405 |
| 2,441,499 | 5/1948 | Medlin | 17/1 E |
| 3,055,046 | 9/1962 | Hlavacek et al. | 17/1 E |
| 3,724,744 | 4/1973 | Carnahan | 231/2 E |
| 3,745,938 | 7/1973 | Hathaway et al. | 2/2.5 |
| 3,819,108 | 6/1974 | Jordan | 273/84 |

Primary Examiner—Clyde I. Coughenour
Attorney, Agent, or Firm—Evan D. Roberts

[57] ABSTRACT

A livestock guide and manipulator panel prod is disclosed by this invention wherein electronic shocking circuitry is provided in combination with a hand-held livestock guiding and directing panel having electronic prods of said circuitry arranged on the surface of the panel.

1 Claim, 5 Drawing Figures

LIVESTOCK GUIDE AND MANIPULATOR

SUMMARY OF THE INVENTION

This invention relates to a livestock guide and manipulator panel prod wherein the livestock can be readily manipulated by a handler by his use of this invention. This device is, among other things, a panel which is provided with a handgrip along a top edge thereof for manipulation of the panel by one or both hands of the operator. A high voltage producing means is adapted to be made a part of this device and is electrically connected to electrodes on the face of the panel of the device and the voltage producing means is readily actuatable by the operator to provide an electric shock prod or guiding effect from the device to the animal by engaging the animal with the electrode face of the device.

This invention is provided with the above referred to combination of novel structures which provide for, among other things, the guiding and manipulating of livestock by providing a highly manipulatable device for, in turn, providing: a visual obstruction guide for the livestock; a physical partial chute obstruction guide for the livestock; and a readily manipulatable electronic prod as a positive urgement, all in combination and readily usable by the operator for guiding and manipulating livestock, and all readily available to the handler as a visual physical and prodding extension of the handler's capabilities.

Other advantages and novel aspects of the invention will become apparent upon the following detailed description, in conjunction with the accompanying drawings wherein.

Figure 1:
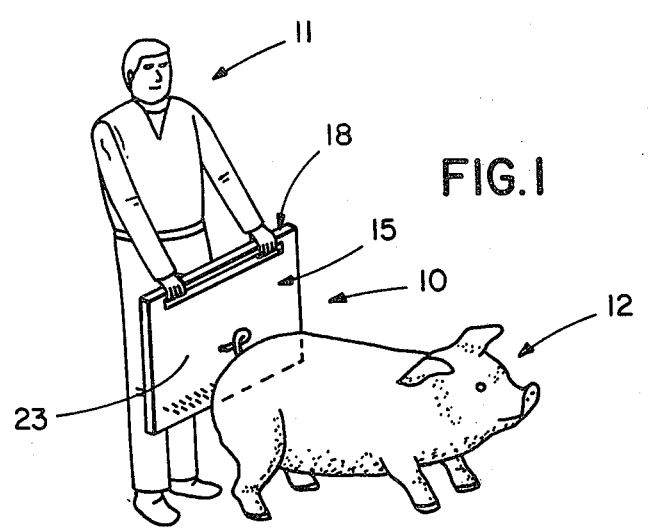
FIG. 1 illustrates the general relationship between the livestock panel prod of this invention, the livestock handler, and the livestock.
Figure 2:
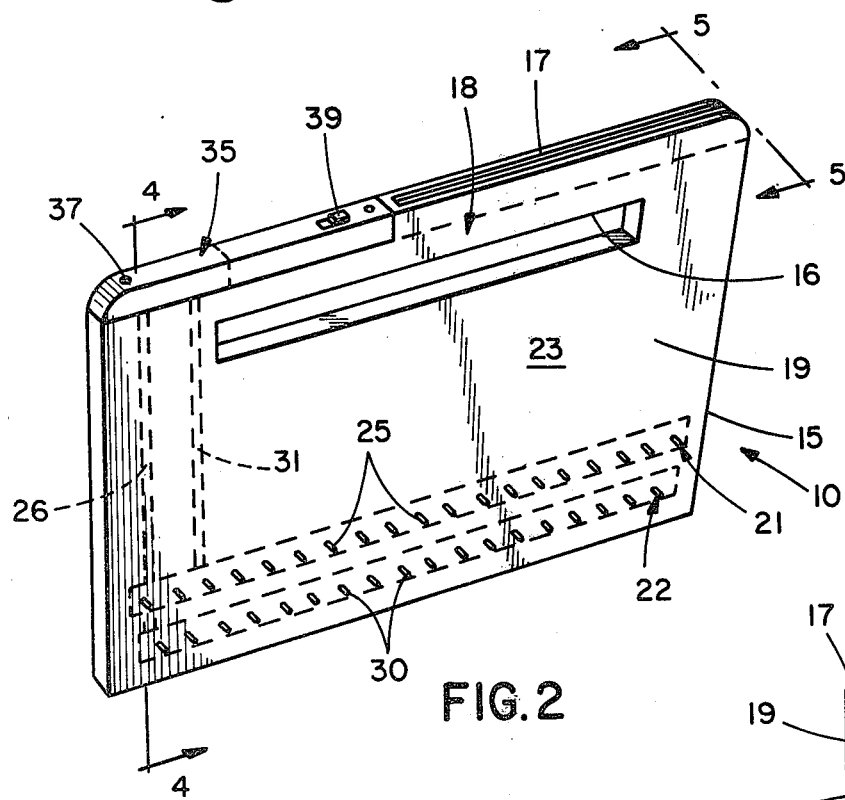
FIG. 2 is a perspective view of the livestock guide and manipulator of this invention illustrating the basic elements thereof.
Figure 4:
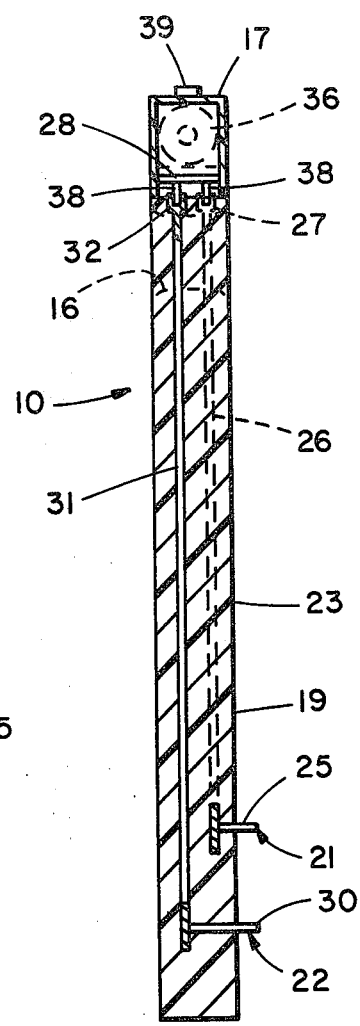
Figure 5:
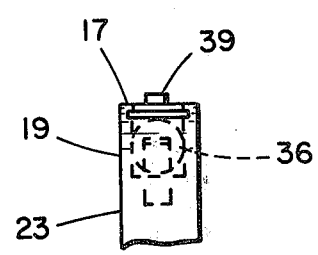
Figure 3:
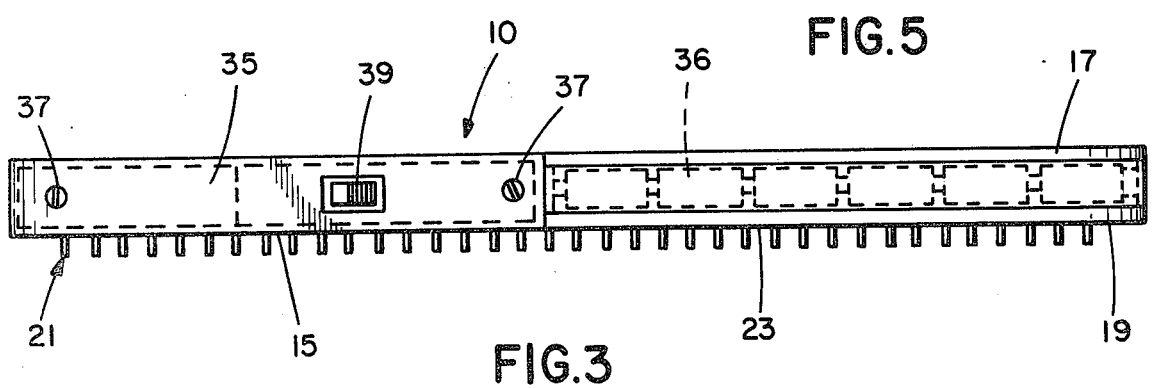
FIG. 3 is a top plan view of the livestock guide and manipulator of this invention illustrating an exemplary positionment and arrangement of a high voltage producing means and the arrangement and configuration of the electroces connected to the high voltage system.

FIG. 4 is a sectional view taken along line 4—4 of FIG. 2 showing the arrangement and interconnection of the high voltage system and the electronic prods on the surface of the panel of the invention; and FIG. 5 is a partial right elevation view of the livestock guide and manipulator of this invention showing the general position of the elements of the high voltage producing means located in the top of the device.

The illustrative example of the livestock guide and manipulator of this invention is generally designated by the numeral 10 (FIGS. 1–4), and is adapted for use by a handler generally designated by the numeral 11 for guiding and manipulating livestock such as pig, generally designated by the numeral 12.

Panel rod 10 is provided with a body 15 having a slot 16 along a top edge 17 thereof and spaced slightly from edge 17 to provide a handgrip portion 18 for one or both of the hands of operator 11. Body 15 has a panel 19, and two sets of electrodes 21 and 22 are provided on a face 23 of panel 19.

Electrode set 21 (FIGS. 2–4) includes a series of electrode posts 25 secured to panel 19 and electrically connected by conduit 26 to a female electrical socket 27 (FIG. 4) adjacent a recessed surface 28 in the top handgrip portion 18 of panel 19. Electrode set 22 includes a series of electrode posts 30 secured to panel 19 and electrically connected by conduit 31 to a female electrical socket 32 adjacent recessed surface 28 in the top handgrip portion 18 of panel 19.

A high volage power supply means, generally designated by the numeral 35, is provided on the recess 28 of panel 19 and is electrically connectd to a battery supply 36 (FIGS. 4 and 5) contained in the remaining portion of the top grid portion 18 of panel 19. High voltage supply means 35 is secured to panel 19 by screws 37 or other appropriate means and is provided with a pair of male prongs 38 adapted to engage female sockets 27 and 32 by which the high voltage produced thereby is transmitted to electrode sets 21 and 22 through electrical conduits 31 and 26.

It should be noted that the entire top edge of the grip portion of panel could constitute the power supply 35, thereby including the batteries 36 and the power supply unit 35 in a single unit similarly secured to the top edge surface 28 extended, of the panel 19 by screws 37 or other such conventional securing means. High voltage power supply means 35 is actuated by a switch 39 located in grip portion 18 of panel 19 such as that indicated (FIG. 2).

In operation, panel prod is provided with appropriate batteries whereby when switch 39 is actuated, high voltage potential will be applied to electrode sets 21 and 22. Operator 11 can grip panel along gripping means 18 by either one or two hands depending on the desired manipulation and exigencies of operation. Panel 19 can thereby be manipulated for visual, physical and/or electrical guiding, prodding or other manipulation of livestock.

In particular, panel 19 may be manipulatively positioned by operator 11 adjacent the side of the head and neck portion of the livestock, or in front of the livestock, or in some intermediate position, to provide a visual obstruction guide for the livestock. As to the physical guiding or manipulation of the livestock 12, panel 19 may be positioned by the handler 11 with surface 23, in contact with any selected portion of the livestock to provide a wall or partial chute effect, or by a physical slapping or butting effect, to provide the desired physical guidance or resulting manipulation of the livestock 12. As to the electrical prodding, guiding or other manipulation of livestock 12, switch 39 is actuated to apply the high voltage potential of voltage supply 35 to electrode sets 21 and 22 through conduits 31 and 26 whereby placement of electrodes 21 and 22 by handler 11 in contact with livestock 12, the livestock 12 will be prodded by the high voltage electrical current to proddingly guide or otherwise manipulate livestock 12.

Futher, it should be noted that the electrical prodding manipulation of the livestock can be provided individually or in combination with previously referred to operations of visual physical manipulation, either independtly or in combination as selectively desired by handler 11. The livestock guide and manipulative panel prod of this invention provides a comprehensive and highly versatile means for guiding and manipulating livestock at the complete selection and control of an operator as the exigencies of any given livestock herding situation may require.

It is to be understood that the invention is not to be limited to the specific constructions and arrangements shown and described as it will be understood to those skilled in the art that certain changes may be made without departing from the principles of the invention.

What is claimed is:

1. A livestock guide and manipulator comprising a hand carried and manipulated panel body having a lateral panel face to block the view and passage of livestock when positioned adjacent thereto for guiding said livestock, said lateral panel face comprising a large surface many times wider than the thickness of said body, a gripping handle means along one edge of said body to provide means whereby an operator can grasp said body for manipulation thereof, two or more electrodes on said face of said panel projecting from the panel face adjacent the edge thereof opposite said handle means, a high voltage producing means attached to said panel and electrically connected to said electrodes to provide a high voltage electrical potential between certain ones thereof when actuated, and means for selectively actuating said high voltage means whereby livestock will be electrically shocked by said electrodes engaged therewith to urge said livestock for the manipulation thereof.

* * * * *

UNITED STATES PATENT OFFICE
CERTIFICATE OF CORRECTION

Patent No. 4,128,200                  Dated December 5, 1978

Inventor(s) Robert W. Jones and Wesley E. Jones

It is certified that error appears in the above-identified patent and that said Letters Patent are hereby corrected as shown below:

Column 1   line 44   "electroces" should read --electrodes--;

Column 2   line 10   "grid" should read --grip--.

Signed and Sealed this

Twenty-ninth Day of May 1979

[SEAL]

Attest:

RUTH C. MASON
*Attesting Officer*

DONALD W. BANNER
*Commissioner of Patents and Trademarks*